Nov. 10, 1942.  M. LEUPOLD  2,301,218
BRAKING SYSTEM FOR AUTOMOTIVE VEHICLES
Filed March 7, 1941   3 Sheets-Sheet 1
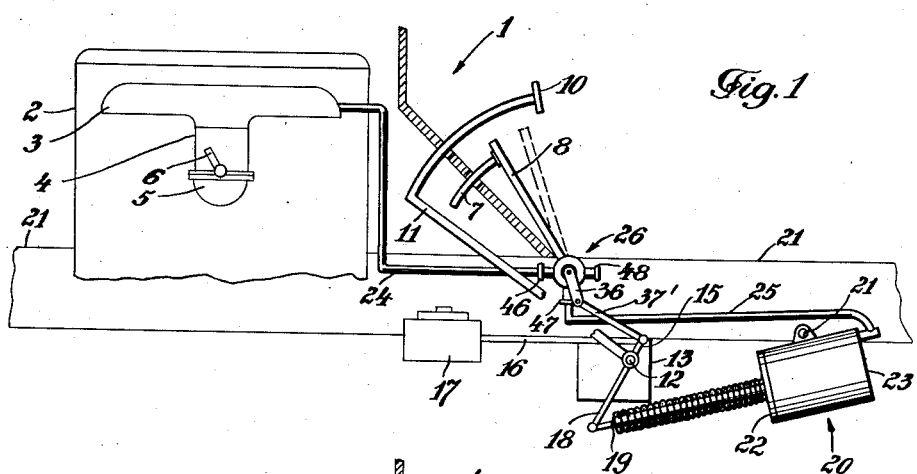
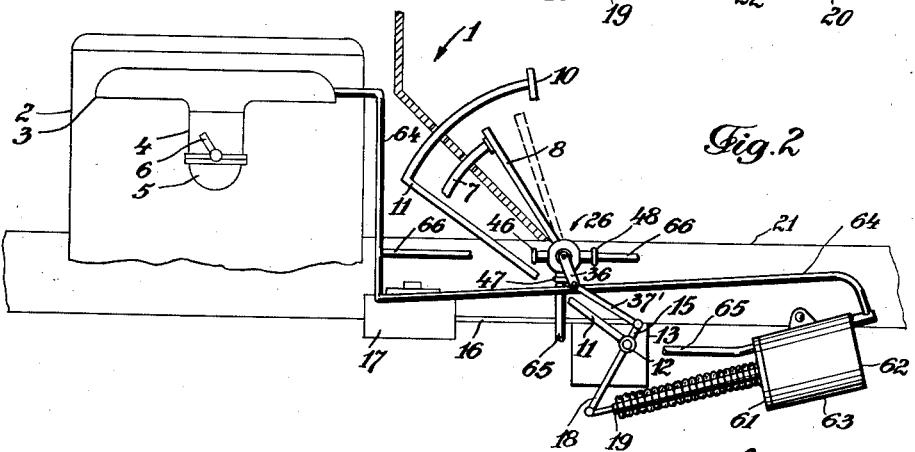
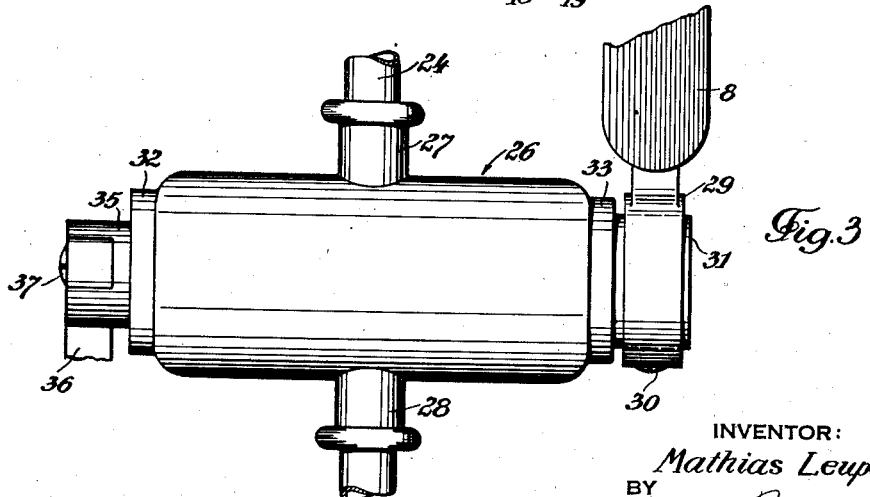
INVENTOR:
Mathias Leupold
BY Louis Burgess
ATTORNEY

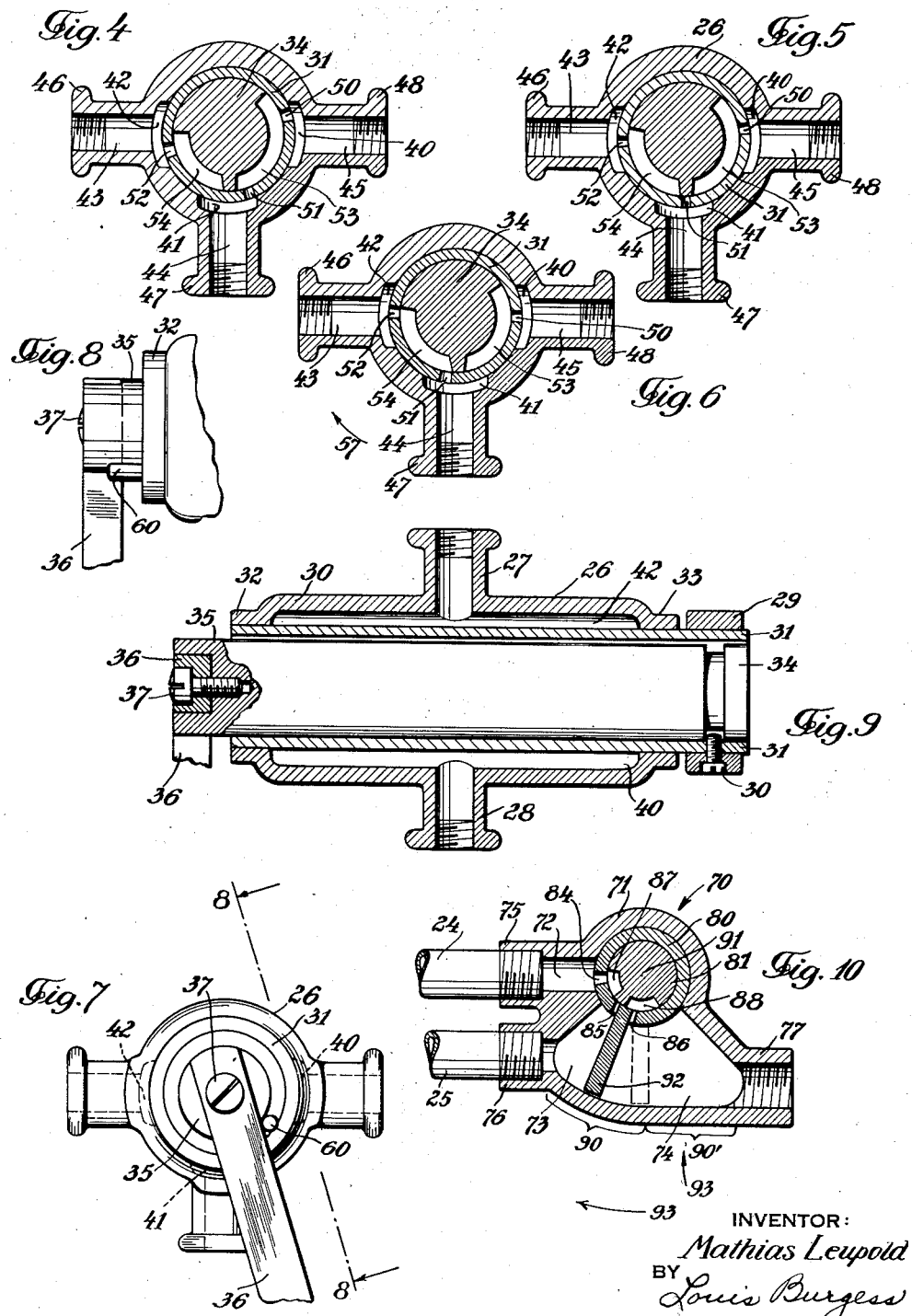

Nov. 10, 1942.    M. LEUPOLD    2,301,218
BRAKING SYSTEM FOR AUTOMOTIVE VEHICLES
Filed March 7, 1941    3 Sheets-Sheet 3
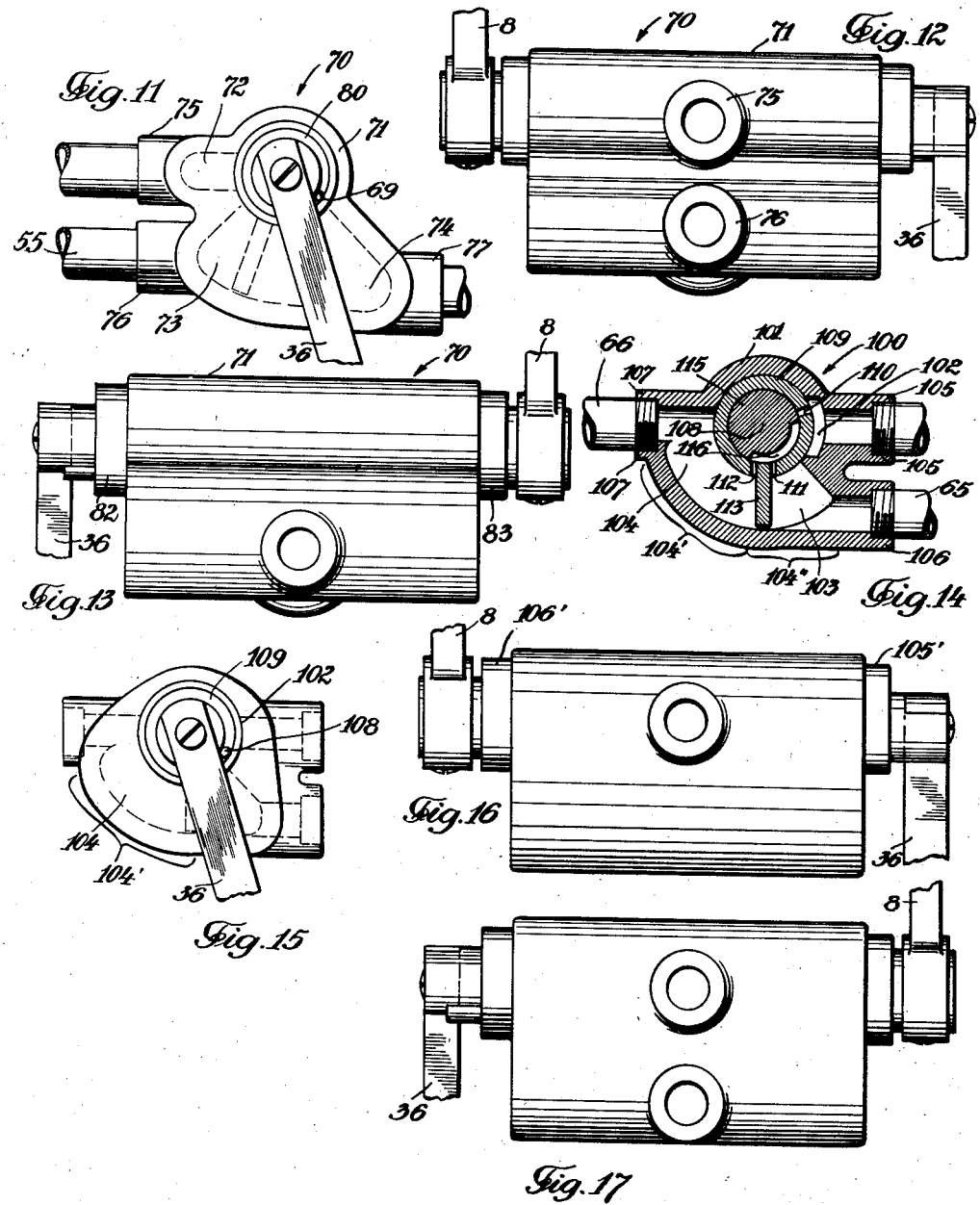
INVENTOR:
Mathias Leupold
BY Louis Burgess
ATTORNEY Patented Nov. 10, 1942

2,301,218

UNITED STATES PATENT OFFICE 2,301,218

BRAKING SYSTEM FOR AUTOMOTIVE VEHICLES

Mathias Leupold, Jamaica, N. Y.

Application March 7, 1941, Serial No. 382,122

7 Claims. (Cl. 192—3)

This invention is a new and useful improvement in braking systems for automotive vehicles.

One object of this invention is a new and useful improvement in braking control for automotive vehicles by using the customary accelerator or accelerator treadle to also control the brakes of the vehicle so as to enable the driver to safely and quickly control the movement of his vehicle by one foot movement—downward for accelerating and upward for stopping—resulting in safer, faster and quicker control of the vehicle.

Another object of this invention is to provide auxiliary means to effect the upward or decelerating movement of the operating treadle with the same relative intensity as the power medium in the power cylinder that actuates the brake pedal or (where no brake pedal is used) brake applying mechanism.

Another object of this invention is the construction of this auxiliary treadle actuating means in such shape that no pressure and very little friction is left therein which would impede the easy and normal operation of the treadle in its accelerating range.

The invention will be fully understood from the following description read in conjunction with the drawings, in which Fig. 1 is a longitudinal vertical section through one embodiment of my invention;

Fig. 2 is a longitudinal vertical section through an alternative embodiment of my invention;

Fig. 3 is a top view of part of the construction shown in Fig. 1;

Figs. 4, 5 and 6 are central vertical sections through a part of the construction shown in Fig. 3 showing the moving parts in different operative positions;

Fig. 7 is an end view of the construction shown in Figs. 4-6 inc.;

Fig. 8 is a view of part of the construction shown in Fig. 7 on the plane indicated by 8—8;

Fig. 9 is a central horizontal section through the construction shown in Figs. 4-6 inc.;

Fig. 10 is a central vertical section through an alternative embodiment of one element of my invention;

Fig. 11 is an end view of the construction shown in Fig. 10;

Fig. 12 is a front view of the construction shown in Figs. 10 and 11;

Fig. 13 is a rear view of the construction shown in Figs. 10-12;

Fig. 14 is a central vertical section through a further alternative embodiment of one element of my invention;

Fig. 15 is an end view of the construction shown in Fig. 14;

Fig. 16 is a front view of the construction shown in Figs. 14 and 15; and

Fig. 17 is a rear view of the construction shown in Figs. 14-16 inc.

Referring to Fig. 1, I designates an automotive vehicle of the type driven by internal combustion engine 2 equipped with intake manifold 3 communicating through duct 4 with carburetor 5. Insofar as my specific invention is concerned, the intake manifold is a convenient source of vacuum and any other means of producing vacuum, such as a vacuum pump, may be equivalently employed. Flow of mixture from the carburetor through the duct is controlled by the usual butterfly valve operated by arm 6. The arm 6 is controlled through intermediate connections (not shown) by the push rod 7 which bears against and is actuated by the foot treadle 8. In its movement downwardly from the position shown in solid outline in Fig. 1, this treadle operates as an accelerator to determine the amount of combustible mixture fed to the engine from the carburetor. It is, however, adapted for movement upwardly beyond the position shown in solid outline in Fig. 1 to the position shown in dotted outline in Fig. 1 and within this range operates through the mechanism hereinafter more fully described to controllably apply the brakes of the car.

In automobiles as at present constructed, in order to initiate braking, it is necessary for the operator to remove his foot from the accelerator pedal to the brake pedal and while the time required for this operation is not relatively long, it may, under various conditions, be critical, especially at higher driving speeds. I am aware that efforts have heretofore been made to solve this problem by so constructing the accelerator pedal and ancillary equipment that the brake is automatically applied by the further upward movement of the accelerator pedal. Such systems, however, present the difficulty that there is no precise control over the extent of the braking action or at most a relatively inexact control. In the apparatus which I have invented and which is hereinafter described, however, the desired advantages are retained while the specific disadvantages are eliminated and the extent of the braking action is subject to the precise and exact control of the operator by the extent to which he permits the accelerator pedal to rise. Moreover, in one embodiment of my invention the operator can feel the exact extent to which the braking system is applied since the force urging the treadle upwardly is, within the braking range, exactly proportional to the degree of braking action.

Within the range of acceleration and up into the braking range the treadle 8 may be urged upwardly by any suitable spring not shown. This may also, if desired, be used to urge the treadle upwardly within the braking range.

The automobile 1 is equipped with a suitable braking system which in the specific embodiment illustrated is of the hydraulic type, and for this purpose the automobile is provided with the foot pedal 10 connected to lever 11 pivotally carried by the stud 12 which is in turn carried by the depending bracket 13. The lever arms 18 and 15 are integral with the lever 11. The arm 15 is pivotally connected to the push rod 16 which operates the master cylinder 17 of the hydraulic braking system. The arm 18 is pivotally connected to piston rod 19 of power cylinder 20. Power cylinder 20 is pivotally connected by stud 21 to the chassis of the car. The power cylinder shown in Fig. 1 is of the single line type in which the piston rod is normally extended and the piston is normally in the end 22 of the power cylinder, but is retracted back into the cylinder to operate the braking system by the application of vacuum to the end 23 of the power cylinder. This kind of power cylinder is alternatively referred to in the trade as an air suspended power cylinder. For this purpose the end 23 of the power cylinder is connected through duct 25 to three-way valve 26 which in turn is connected to duct 24 leading to the intake manifold. Fig. 3 is a top view of the valve 26 from which it appears that the tube 24 from the intake manifold is connected to neck 27 at the forward end of the valve. The treadle 8 is pivotally connected to the right-hand side of the valve while neck 28 is open to the atmosphere. By reference to Fig. 9 it will be seen that the ring 29 constituting the lower end of the treadle 8 is secured by set screw 30 to a sleeve 31 carried by the ends 32 and 33 of the valve which are bored to form bearings or journals within which the sleeve may turn. Journaled within the sleeve itself is a channeled plug 34, one end 35 of which projects beyond the left-hand side of the valve. The projecting end 35 is slotted to receive the lever arm 36 secured in position by set screw 37. The arm 36 (Fig. 1) is pivotally connected to the push rod 37' pivotally connected to the lever 15.

It is evident from the foregoing that the sleeve 31 is connected to and turned by the treadle 8, whereas the plug 34 journaled within the sleeve 31 is connected to and turned by the braking system. The housing 30 of the valve defines ports while the sleeve 31 defines longitudinal slots and the plug 34 defines longitudinal channels, the function of which will be apparent from Figs. 4-9. Referring to Fig. 7, the ports are three in number and are indicated by the dotted outlines 40, 41 and 42. As is evident from Fig. 9, these ports extend the full width of the valve up to the journals 32 and 33. In the center sections of the valve shown in Figs. 4-6 inc., these ports converge into the ducts 43, 44 and 45 defined by the threaded necks 46, 47 and 48. The sleeve 31 defines slots 50, 51 and 52 which slots extend the full length of the said ports leaving the sleeve unslotted within the areas covered by the journals 32 and 33. The plug 34 defines channels 53 and 54. These channels extend the full length of the slots 50, 51 and 52, while the ends of the plug within the area overlain by journals 32 and 33 are not channelled.

In the set-up shown in Fig. 1, the tube 24 leading from the intake manifold is connected to the threaded neck 46, neck 48 is open to the air, while threaded neck 47 is connected to tube 25 communicating with end 23 of power cylinder 20.

In Fig. 4 the sleeve and plug are shown in the relative positions they occupy when the brake is unapplied and the treadle is in the accelerating zone, i. e., when it is depressed below the position shown in solid outline in Fig. 1. In this position it will be seen that there is free communication between neck 48 and 47 through duct 45, port 40, slot 50, channel 53, slot 51, port 41, and duct 44. This communication is maintained throughout the entire range of acceleration, since the ports 40 and 41 are wide enough to overlie the slots 51 and 50 in any part of this range.

In Fig. 5 the sleeve 31 and plug 34 are shown in the neutral position, i. e., with the brake unapplied and with the accelerator in neutral position shown by solid outline in Fig. 1. In this position it will be noted that there is no communication through the valve 26. When, however, the accelerator pedal moves upwardly into the braking region, the sleeve 31 moves in the direction shown by arrow 57 (Fig. 6). In this position the vacuum of the intake manifold from tube 24 is thrown into communication with tube 25 leading to the power cylinder through neck 46, duct 43, port 42, slot 52, channel 54, slot 51, port 41 and duct 44. In this way vacuum is applied to end 23 of power cylinder 20 with the consequent retraction of piston rod 19 and the application of the brakes. As the braking system moves, however, rod 37 and lever 36 (Fig. 1) rotates plug 34 in the direction shown by arrow 57 (Fig. 6), whereupon that portion of plug 34 between the channels 53 and 54 overlies slot 51 and interrupts communication, and insures that the application of the braking system will be arrested at any point determined by holding the treadle stationary. For maximum precision the width of the raised portion of plug 34 should be exactly equal to the width of slot 51. Sleeve 31 carries a stop 60 which by contacting with lever 36 limits the motion of the sleeve and treadle with respect to the braking system (Figs. 7 and 8) so that the treadle will maintain a position slightly in advance of the braking action.

In Fig. 2 I have illustrated an alternative type of power cylinder of the dual line type. In this case ends 61 and 62 of power cylinder 63 are normally both subjected to vacuum. The end 62 is continuously subjected to vacuum through tube 64 communicating with intake manifold 3. The end 61 is usually subjected to vacuum and the power cylinder is operated by admitting air into the end 61 which sets up a pressure differential retracting piston rod 19. This kind of power cylinder is alternatively referred to in the trade as a vacuum suspended power cylinder. The same valve structure is employed connected to the treadle and the braking system in the same way and neck 47 of the valve is connected through tube 65 (Fig. 2) with end 61 of the power cylinder. Tube 66 communicating with the intake manifold is, however, carried to the neck 48, while neck 46 of the valve is open to the air. As aforesaid, with the brake in neutral or unapplied position, and the treadle in the accelerating range, there is free communication between necks 48 and 47, with the resultant full application of vacuum to the end 61 of the power cylinder. When, however, the treadle moves in the braking range, this communication is interrupted and air from the neck 46 (Fig. 6) is admitted into end 61 of the power cylinder, setting up a pressure differential, thereby applying the brakes, and whenever the braking system has advanced to a point determined by the position of the treadle, the introduction of air is arrested, and the brakes are held at the point so determined. It is evident that any downward movement of the treadle within the braking range reverses the port connection and operates conversely to release the brake until a release position is arrived at determined by the position of the treadle.

In Figs. 10–13 inc., I have shown an alternative form of three-way control valve. This specific form is adapted for use in the system shown in Fig. 1 in which the power cylinder is single line. This valve 70 includes the housing 71 defining longitudinal ports 72, 73 and 74, communicating respectively, with the threaded necks 75, 76 and 77. Neck 75 is connected to tube 24 running from the intake manifold; neck 76 is connected to tube 25 running to end 23 of the power cylinder, while neck 77 is open to the air. Sleeve 80 is connected to the treadle in the manner hereinbefore described while plug 81 is connected to the braking system. The sleeve 80 is carried in the journaled ends 82 and 83 of the housing 71 (Fig. 13). The ports 72, 73 and 74 extend up to the journals and the slots 84, 85 and 86 similarly extend the full width of the ports, i. e., up to but not into the area overlain by the journals 82 and 83. The plug 81 also defines channels 87 and 88, which extend up to but not into the area overlain by journals 82 and 83. The distinguishing feature of this construction is that the longitudinal ports 73 and 74 define a segment or section 90 (Fig. 10) which is of arcuate cross-section concentric with axis of rotation 91, while the sleeve 80 carries a projecting flap or vane piston 92, that fits snugly into this arcuate section forming therewith a substantially gas-tight seal and extending up to the ends of the arcuate section to which it snugly conforms. Within the section 90', however, the vane piston has clearance radially and at the ends as well the housing being cut back to allow end clearance and eliminate any friction between housing and vane piston within the accelerating range. When the treadle is in neutral position, this flap or piston depends vertically into the position shown in dotted outline in Fig. 10; slot 84 is out of the range of port 72 and air moves freely from neck 77 to neck 76 around the vane piston, as well as through slot 86, channel 88 and slot 85, and thence to tube 25 to end 23 of power cylinder 20. When, however, the treadle is permitted to move up into the braking range, this communication is broken while neck 75 connected to tube 24 is placed into communication with neck 76 communicating with tube 25 through port 72, slot 84, channel 87, slot 85 and port 73. Within this range it will be noted that port 73 is under vacuum, there is, therefore, a differential pressure urging the vane piston 92 in the direction indicated by arrow 93 (Fig. 10). This insures that there will be an upward pressure on the treadle functionally dependent on the exact extent to which the braking system has been applied.

The form of valve shown in Figs. 14–17 inc., is similar in principle but specifically adapted for use in the system shown in Fig. 2 in which the power cylinder is dual control. In this case the valve 100 includes housing 101 defining longitudinal ports 102, 103 and 104 communicating respectively with threaded necks 105, 106 and 107. These ports extend the width of the housing up to the journaled bearings 105' and 106'. The neck 107 is connected to tube 66 leading from the intake manifold, while the neck 106 is connected to tube 65 leading to end 61 of the power cylinder and neck 105 is open to the air. The port 104 defines an arcuate section concentric with the axis of rotation 108 of sleeve 109. Sleeve 109 defines the slots 110, 111 and 112 and carries the flap or vane piston 113 adapted to move in the arcuate section 104' of the port 104, making a snug and substantially gas-tight contact therewith both radially and at the ends of the vane piston. Within the section 104'', however, the vane piston has clearance both radially and at the ends the housing being cut back to allow clearance and eliminate any friction between housing and vane piston within the accelerating range. The slots 110, 111 and 112 extend the full width of the sleeve up to but not into the area overlain by the journals or bearings 105 and 106. The plug 115 defines a single longitudinal channel 116 extending up to but not into the area overlain by journals 105' and 106'. The valve is shown in Fig. 14 with the ports in neutral position and with the vane piston 113 projecting vertically downward. In this position neck 107 is in free communication with neck 106 through port 104, slot 112, channel 116, slot 111 and port 103. There is no differential pressure on piston 113. When, however, the treadle moves up into the braking range, slot 112 is overlain by plug 115, thereby breaking communication between necks 107 and 106. Simultaneously, slot 110 moves down into registry with port 102, thereby setting neck 105 in communication with neck 106 through port 102, slot 110, channel 116, slot 111 and port 103. Inasmuch as the side of piston 113 exposed to port 104 is continuously subject to vacuum, there is a differential pressure urging the treadle upwardly and providing the operator with an upward pressure functionally proportional to the extent to which the brakes have been applied.

In both the systems shown in Figs. 10–13, and 14–17, the spring which urges the treadle upwardly must move it slightly beyond the neutral position and into the commencement of the braking range, where the pressure differential takes hold. With the valve shown in Figs. 11–15, inc., a stop 69 is provided (Fig. 11) projecting from the sleeve 80 which has the same function as stop 60 previously described. With the valve illustrated in Figs. 15–17 stop 138 (Fig. 15) is similarly provided carried by sleeve 109 and which similarly functions by contact with lever 36.

The effect in either case is to insure that the treadle in the braking range will move upwardly only insofar as the braking system is applied, thereby insuring a gradual and accurately controllable braking effect.

While I use the word "treadle" in the specification and claims, it will be understood that I mean to include the foot pedal and similar means that operate by movement in a vertical plane to control the acceleration of the vehicle.

It will be understood that the foregoing description is for purposes of illustration and not of limitation, and it is therefore my intention that the invention be limited only by the following claims or their equivalents wherein I have endeavored to claim broadly all inherent novelty.

I claim:

1. In an automotive vehicle including means for producing vacuum, and including a braking system and a dual line power cylinder operatively connected to said braking system and having a first end connected to said means for producing vacuum, a treadle controlling the acceleration of said vehicle in its downward movement from idling position and adapted for movement upwardly from idling position, a three-way valve adapted to alternatively place the other end of said power cylinder in communication with said means for producing vacuum and with atmospheric pressure, said three-way valve being operatively connected to said treadle and adapted to open to place the other end of said power cylinder in communication with atmospheric pressure in response to the movement of said treadle upwardly from said point, a cut-off following the movement of said valve operatively connected to said braking system, blocking said last mentioned opening when the braking system reaches a point of application determined by the extent of upward movement of said treadle.

2. In an automotive vehicle including means for producing vacuum, and including a braking system and a power cylinder operatively connected to said braking system, a treadle controlling the acceleration of said vehicle in its movement downwardly from idling position and adapted for movement upwardly from said idling position, a three-way valve adapted to alternatively place said power cylinder in communication with said means for producing vacuum, and with atmospheric pressure, said three-way valve comprising a tubular sleeve defining slots journaled for rotational movement and operatively connected to said treadle, a housing surrounding said sleeve defining ports, means connecting said ports respectively with said means for producing vacuum with said power cylinder and with atmospheric pressure, said valve being adapted to open to operate said power cylinder in response to the movement of said treadle upwardly from idling position, a channeled plug journaled in said sleeve, said plug being operatively connected to said braking system and adapted to overtake said sleeve and block said last mentioned opening when the braking system reaches a point of application determined by the extent of upward movement of said treadle.

3. Apparatus according to claim 2 in which said tubular sleeve carries a vane piston and said housing defines a chamber of arcuate section within which said vane piston moves when said treadle is upwardly with respect to idling position and the said ports are so arranged that when said vane piston is in said arcuate section, the vane piston is subject to a pressure differential urging said treadle upwardly with respect to idling position.

4. In an automotive vehicle including means for producing vacuum, and including a braking system and an air suspended power cylinder operatively connected to said braking system, a treadle controlling the acceleration of said vehicle in its movement downwardly from idling position and adapted for movement upwardly from said idling position, a three-way valve adapted to alternatively place said power cylinder in communication with said means for producing vacuum, and with atmospheric pressure, said three-way valve comprising a tubular sleeve defining slots journaled for rotational movement and operatively connected to said treadle, a housing surrounding said sleeve defining ports, means connecting said ports respectively with said manifold with said power cylinder and with atmospheric pressure, said valve being adapted to open to place said power cylinder in communication with said means for producing vacuum in response to the upward movement of said treadle from idling position, a channeled plug journaled in said tubular sleeve, operatively connected to said braking system, said plug being adapted to overtake and block said last mentioned opening when the braking system reaches a point of application determined by the extent of upward movement of said treadle.

5. Apparatus according to claim 4 in which said tubular sleeve carries a projecting vane piston and said housing defines a chamber of arcuate section within which said vane piston moves when said treadle is upwardly with respect to idling position and the said ports are so arranged that when said vane piston is in said arcuate section, the vane piston is subject to a pressure differential urging said treadle upwardly with respect to said point.

6. In an automotive vehicle including means for producing vacuum, and including a braking system and a dual line power cylinder operatively connected to said braking system and having a first end connected to said means for producing vacuum, a treadle controlling the acceleration of said vehicle in its movement downwardly from idling position and adapted for movement upwardly from idling position, a three-way valve adapted to alternatively place the other end of said power cylinder in communication with said manifold, or with atmospheric pressure, said three-way valve comprising a tubular sleeve defining slots journaled for rotational movement and operatively connected to said treadle, a housing surrounding said sleeve defining ports, means connecting said ports respectively with said manifold with said power cylinder and with atmospheric pressure, said valve being adapted to open to place the other end of said power cylinder in communication with atmospheric pressure in response to the movement of said treadle upwardly from idling position and a channeled plug journaled in said tubular sleeve operatively connected to said braking system and adapted to overtake and block said last mentioned opening when the braking system reaches a point of application determined by the extent of upward movement of said treadle.

7. Apparatus according to claim 6 in which said tubular sleeve carries a projecting vane piston and said housing defines a chamber of arcuate section within which said vane piston moves when said foot pedal is upwardly with respect to idling position and the said ports are so arranged that when said vane piston is in said arcuate section, the vane piston is subject to a pressure differential urging said treadle upwardly with respect to idling position.

MATHIAS LEUPOLD.